(12) United States Patent
Schurb et al.

(10) Patent No.: US 9,889,539 B1
(45) Date of Patent: Feb. 13, 2018

(54) CONVERTING RESIDUAL SURFACE STRESS IN INTERNAL OPENING OF ADDITIVELY MANUFACTURED COMPONENT

(71) Applicant: General Electric Company, Schenectady, NY (US)

(72) Inventors: Julius Andreas Schurb, Zurich (CH); Thomas Etter, Muhen (CH); Brendon James Leary, Simpsonville, SC (US); Felix Martin Gerhard Roerig, Baden (CH)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/680,488

(22) Filed: Aug. 18, 2017

(51) Int. Cl.
*B23P 15/26* (2006.01)
*B24C 1/10* (2006.01)
*C21D 7/06* (2006.01)

(52) U.S. Cl.
CPC ............... *B24C 1/10* (2013.01); *B23P 15/26* (2013.01); *C21D 7/06* (2013.01)

(58) Field of Classification Search
CPC .............. B24C 1/10; C21D 7/06; B23P 15/26
USPC ........................................................... 72/53
See application file for complete search history.

(56) References Cited

U.S. PATENT DOCUMENTS

| 3,754,976 A | * | 8/1973 | Babecki | .................. C23C 24/04 |
| | | | | 29/527.2 |
| 4,713,882 A | * | 12/1987 | Bianchi | .................. B21D 39/06 |
| | | | | 29/726 |
| 5,443,201 A | * | 8/1995 | Cartry | .................... B23K 9/048 |
| | | | | 219/76.16 |
| 5,509,286 A | | 4/1996 | Coulon | |
| 7,644,599 B2 | | 1/2010 | Hoffmann-Ivy et al. | |
| 9,149,908 B2 | | 10/2015 | Kobayashi et al. | |
| 9,440,397 B1 | | 9/2016 | Fly | |

\* cited by examiner

*Primary Examiner* — David B Jones
(74) *Attorney, Agent, or Firm* — Ernest G. Cusick; Hoffman Warnick LLC

(57) ABSTRACT

Methods include converting a residual surface stress in a component made by a metal powder additive manufacturing process. The component includes a body having an external surface and an internal opening passing at least partially through the body, the internal opening including an unused metal powder from the additive manufacturing process therein. Residual surface stress is converted in at least a portion of a body about the internal opening by applying a pressure in the internal opening using a non-compressible fluid and the unused metal powder. The method is advantageous for use with gamma primed hardened superalloys. An additively manufactured component including the stress-converted internal opening is also disclosed.

17 Claims, 6 Drawing Sheets

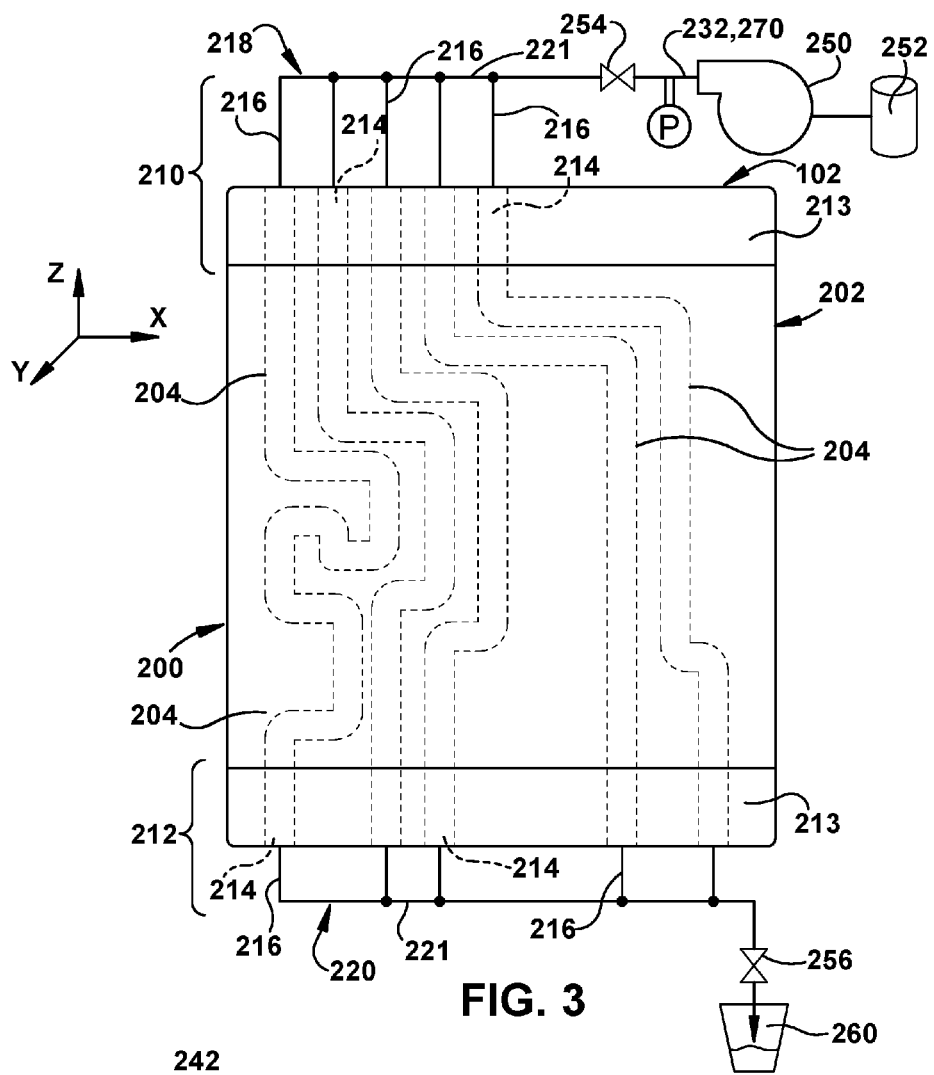
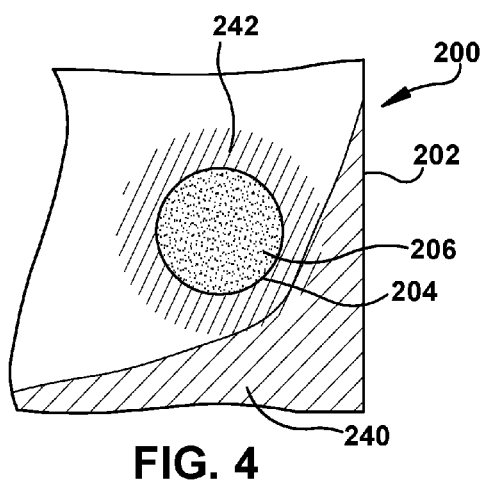
FIG. 3
FIG. 4

CONVERTING RESIDUAL SURFACE STRESS IN INTERNAL OPENING OF ADDITIVELY MANUFACTURED COMPONENT

BACKGROUND OF THE INVENTION

The disclosure relates generally to stress relief in metal components, and more particularly, to a method of converting residual surface stress in an internal opening of an additively manufactured component to a lesser stress or a different type stress.

Conventional manufacture of metal components generally includes milling or cutting away regions from a slab of material before treating and modifying the cut material to yield a part, which may have been simulated using computer models, e.g., in drafting software. Manufactured components which may be formed from metal can include, e.g., airfoil components for installation in a turbomachine such as an aircraft engine or power generation system. Additive manufacturing (AM) includes a wide variety of processes of producing a component through the successive layering of material rather than the removal of material. As such, additive manufacturing can create complex geometries without the use of any sort of tools, molds or fixtures, and with little or no waste material. Instead of machining components from solid billets of material, much of which is cut away and discarded, the only material used in additive manufacturing is what is required to shape the component. Additive manufacturing techniques typically include taking a three-dimensional computer aided design (CAD) file of the component to be formed, electronically slicing the component into layers, e.g., 18-102 micrometers thick, and creating a file with a two-dimensional image of each layer, including vectors, images or coordinates. The file may then be loaded into a preparation software system that interprets the file such that the component can be built by different types of additive manufacturing systems. In 3D printing, rapid prototyping (RP), and direct digital manufacturing (DDM) forms of additive manufacturing, material layers are selectively dispensed, sintered, formed, deposited, etc., to create the component.

In metal powder additive manufacturing techniques, such as direct metal laser melting (DMLM) (also referred to as selective laser melting (SLM)), metal powder layers are sequentially melted together to form the component. More specifically, fine metal powder layers are sequentially melted after being uniformly distributed using an applicator on a metal powder bed. Each applicator includes an applicator element in the form of a lip, brush, blade or roller made of metal, plastic, ceramic, carbon fibers or rubber that spreads the metal powder evenly over the build platform. The metal powder bed can be moved in a vertical axis. The process takes place in a processing chamber having a precisely controlled atmosphere. Once each layer is created, each two dimensional slice of the component geometry can be fused by selectively melting the metal powder. The melting may be performed by a high power melting beam, such as a 100 Watt ytterbium laser, to fully weld (melt) the metal powder to form a solid metal. The melting beam is moved or deflected in the X-Y direction, and has an intensity sufficient to fully weld (melt) the metal powder to form a solid metal. The metal powder bed may be lowered for each subsequent two dimensional layer, and the process repeats until the component is completely formed.

Use of certain materials creates challenges for metal powder additive manufacturing. For example, gamma prime hardened superalloys (e.g., nickel-based) are advantageous materials to produce components using DMLM. "Gamma prime" is a coherently precipitating phase in which there is a close match in matrix/precipitate lattice, resulting in a material having a long-duration stability. After manufacturing, the additively manufactured components using such materials are exposed to a stress relief heat treatment during which the components suffer from macro-cracking caused by high residual surface stresses in the component. This phenomenon may be referred to as strain age cracking (SAC). A potential mechanism to mitigate SAC includes shot peening applied to an external surface of the component to prevent macro-cracking in the external surface, i.e., to introduce compressive stress to compensate for a high residual tensile surface stress. With increased component complexity, especially with intricate internal features like near wall cooling passages, the effectiveness of shot peening is limited because it is only applicable to an external surface of the component, not internal openings. Consequently, certain applications for a component using gamma prime hardened superalloys having complex internal geometries are not feasible.

BRIEF DESCRIPTION OF THE INVENTION

A first aspect of the disclosure provides a method, including: receiving a component made by a metal powder additive manufacturing process, the component including a body having an external surface and an internal opening passing at least partially through the body, the internal opening including an unused metal powder from the additive manufacturing process therein; and converting a residual surface stress in at least a portion of the body about the internal opening by applying a pressure in the internal opening using a non-compressible fluid and at least a portion of the unused metal powder.

A second aspect of the disclosure provides a method, including: receiving a component made by a metal powder additive manufacturing process, the component including a body having an external surface and an internal opening passing at least partially through the body, the internal opening including an unused metal powder from the additive manufacturing process therein; and converting a residual surface stress in in at least a portion of the body about the internal opening by applying a pressure in the internal opening using a non-compressible fluid and at least a portion of the unused metal powder by: first oscillating the pressure of the non-compressible fluid with the at least a portion of the unused metal powder in the internal opening, and second consistently applying the pressure of the non-compressible fluid with the at least a portion of the unused metal powder in the internal opening at a value that is a percentage of a tensile strength of a material of the component; purging the internal opening of the unused metal powder; converting a residual surface stress in the external surface by cold working the external surface; and heat treating the component.

A third aspect of the disclosure provides an additively manufactured (AM) component, comprising: a body having an external surface and an internal opening passing at least partially through the body, wherein the external surface includes a tensile stress therein, and wherein at least a portion of an internal surface of the internal opening includes a compressive stress therein. The internal opening may be within 0.3 to 3.0 millimeters of the external surface of the body. The component may include, for example, a nickel-based gamma prime hardened superalloy and a cobalt-based gamma prime hardened superalloy.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 3 shows a longitudinal cross-sectional view of the illustrative component of FIG. 2 along line 3-3.

FIG. 4 shows a partial lateral cross-sectional view of the illustrative component of FIG. 2 along line 4-4.

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION OF THE INVENTION

As indicated above, the disclosure provides methods for converting a residual surface stress in a component made by a metal powder additive manufacturing process. The component includes a body having an external surface and an internal opening passing at least partially through the body, the internal opening including an unused metal powder from the additive manufacturing process therein. Residual surface stress is converted in at least a portion of a body about the internal opening by applying a pressure in the internal opening using a non-compressible fluid and at least a portion of the unused metal powder. The method is advantageous for use with gamma primed hardened superalloys. An additively manufactured component including the stress-converted internal opening is also disclosed.

Figure 1:
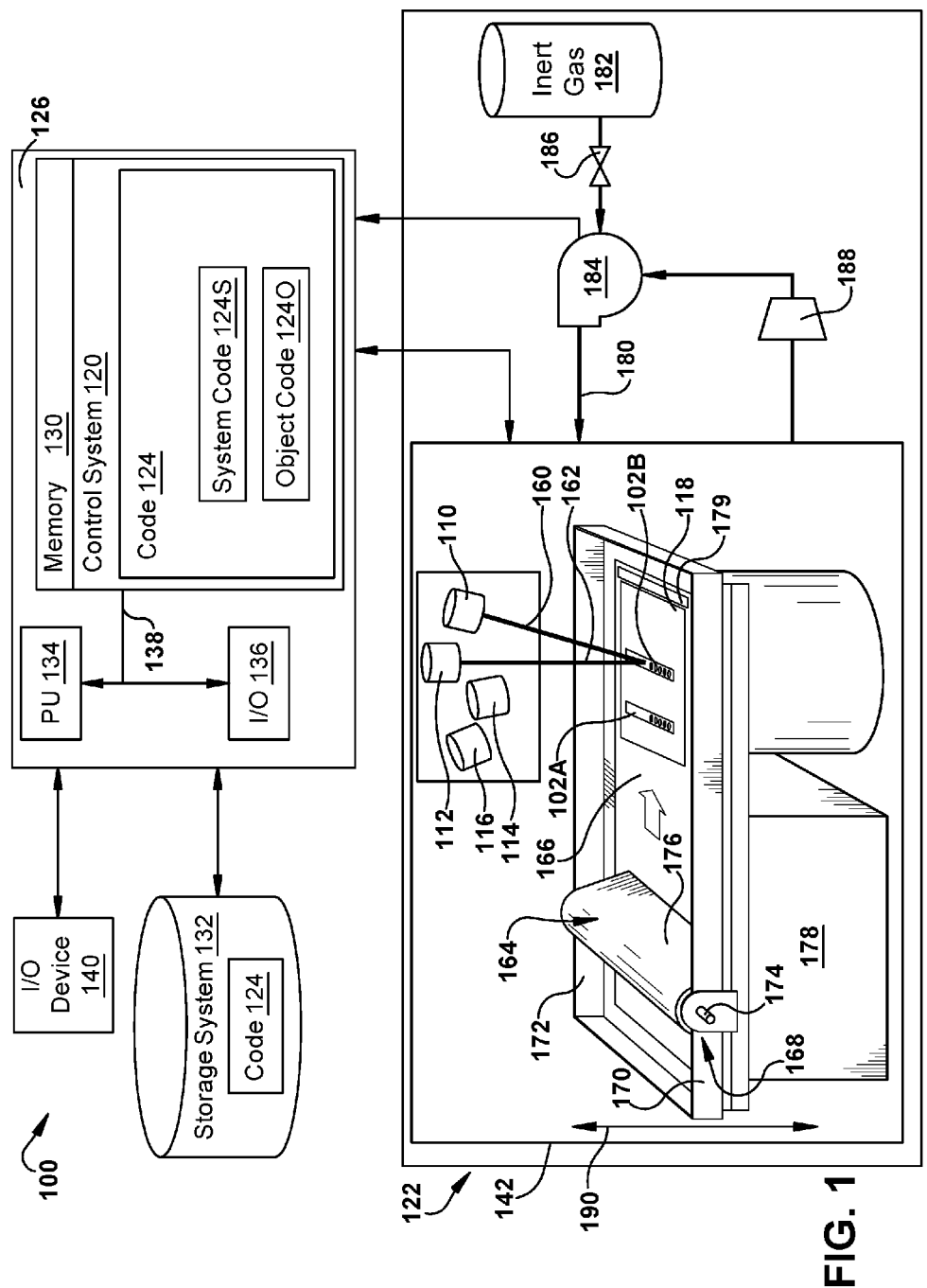
FIG. 1 shows a block diagram of an additive manufacturing system and process including a non-transitory computer readable storage medium storing code representative of a component according to embodiments of the disclosure.

FIG. 1 shows a schematic/block view of an illustrative computerized metal powder additive manufacturing system 100 (hereinafter 'AM system 100') for initially generating an additively manufactured (AM) component(s) 102. AM component 102 may include one large AM component or multiple AM components, e.g., two AM components 102A, 102B as shown, of which only a single layer is shown. The teachings of the disclosures will be applied to AM component(s) 102 built using AM system 100. AM system 100 uses multiple melting beam sources, e.g., four lasers 110, 112, 114, 116, but it is emphasized and will be readily recognized that the teachings of the disclosure are equally applicable to build multiple AM components 102 or a single AM component 102 using any number of melting beam sources, i.e., one or more. In this example, AM system 100 is arranged for direct metal laser melting (DMLM). It is understood that the general teachings of the disclosure are equally applicable to other forms of metal powder additive manufacturing such as but not limited to direct metal laser sintering (DMLS), selective laser sintering (SLS), electron beam melting (EBM), and perhaps other forms of additive manufacturing. AM component(s) 102 are illustrated in FIG. 1 as rectangular elements; however, it is understood that the additive manufacturing process can be readily adapted to manufacture any shaped AM component, a large variety of AM components and a large number of AM components on a build platform 118.

AM system 100 generally includes a metal powder additive manufacturing control system 120 ("control system") and an AM printer 122. As will be described, control system 120 executes set of computer-executable instructions or program code 124 to generate AM component(s) 102 using multiple melting beam sources 110, 112, 114, 116. In the example shown, four melting beam sources may include four lasers. However, the teachings of the disclosures are applicable to any melting beam source, e.g., an electron beam, laser, etc. Control system 120 is shown implemented on computer 126 as computer program code. To this extent, computer 126 is shown including a memory 130 and/or storage system 132, a processor unit (PU) 134, an input/output (I/O) interface 136, and a bus 138. Further, computer 126 is shown in communication with an external I/O device/resource 140 and storage system 132. In general, processor unit (PU) 134 executes computer program code 124 that is stored in memory 130 and/or storage system 132. While executing computer program code 124, processor unit (PU) 134 can read and/or write data to/from memory 130, storage system 132, 110 device 140 and/or AM printer 122. Bus 138 provides a communication link between each of the components in computer 126, and I/O device 140 can comprise any device that enables a user to interact with computer 126 (e.g., keyboard, pointing device, display, etc.). Computer 126 is only representative of various possible combinations of hardware and software. For example, processor unit (PU) 134 may comprise a single processing unit, or be distributed across one or more processing units in one or more locations, e.g., on a client and server. Similarly, memory 130 and/or storage system 132 may reside at one or more physical locations. Memory 130 and/or storage system 132 can comprise any combination of various types of non-transitory computer readable storage medium including magnetic media, optical media, random access memory (RAM), read only memory (ROM), etc. Computer 126 can comprise any type of computing device such as an industrial controller, a network server, a desktop computer, a laptop, a handheld device, etc.

As noted, AM system 100 and, in particular control system 120, executes program code 124 to generate AM component(s) 102. Program code 124 can include, inter alia, a set of computer-executable instructions (herein referred to as 'system code 124S') for operating AM printer 122 or other system parts, and a set of computer-executable instructions (herein referred to as 'object code 124O') defining AM component(s) 102 to be physically generated by AM printer 122. As described herein, additive manufacturing processes begin with a non-transitory computer readable storage medium (e.g., memory 130, storage system 132, etc.) storing program code 124. Set of computer-executable instructions for operating AM printer 122 may include any now known or later developed software code capable of operating AM printer 122.

Object code 1240 defining AM component(s) 102 may include a precisely defined 3D model of an AM component and can be generated from any of a large variety of well-known computer aided design (CAD) software systems such as AutoCAD®, TurboCAD®, DesignCAD 3D Max, etc. In this regard, object code 1240 can include any now known or later developed file format. Furthermore, object code 1240 representative of AM component(s) 102 may be translated between different formats. For example, object code 1240 may include Standard Tessellation Language (STL) files which was created for stereolithography CAD programs of 3D Systems, or an additive manufacturing file (AMF), which is an American Society of Mechanical Engineers (ASME) standard that is an extensible markup-language (XML) based format designed to allow any CAD software to describe the shape and composition of any three-dimensional AM component to be fabricated on any AM printer. Object code 1240 representative of AM component(s) 102 may also be converted into a set of data signals and transmitted, received as a set of data signals and converted to code, stored, etc., as necessary. In any event, object code 1240 may be an input to AM system 100 and may come from a part designer, an intellectual property (IP) provider, a design company, the operator or owner of AM system 100, or from other sources. In any event, control system 120 executes system code 124S and object code 1240, dividing AM component(s) 102 into a series of thin slices that assembles using AM printer 122 in successive layers of material.

AM printer 122 may include a processing chamber 142 that is sealed to provide a controlled atmosphere for AM component(s) 102 printing, e.g., a set pressure and temperature for lasers, or a vacuum for electron beam melting. Build platform 118, upon which AM component(s) 102 is/are built, is positioned within processing chamber 142. A number of melting beam sources 110, 112, 114, 116 are configured to melt layers of metal powder on build platform 118 to generate AM component(s) 102. While four melting beam sources 110, 112, 114, 116 will be described herein, it is emphasized that the teachings of the disclosure are applicable to a system employing any number of sources, e.g., 1, 2, 3, or 5 or more.

Continuing with FIG. 1, an applicator 164 may create a thin layer of raw material 166 spread out as the blank canvas from which each successive slice of the final AM component will be created. Applicator 164 may move under control of a linear transport system 168. Linear transport system 168 may include any now known or later developed arrangement for moving applicator 164. In one embodiment, linear transport system 168 may include a pair of opposing rails 170, 172 extending on opposing sides of build platform 118, and a linear actuator 174 such as an electric motor coupled to applicator 164 for moving it along rails 170, 172. Linear actuator 174 is controlled by control system 120 to move applicator 164. Other forms of linear transport systems may also be employed. Applicator 164 take a variety of forms. In one embodiment, applicator 164 may include a member 176 configured to move along opposing rails 170, 172, and an actuator element (not shown in FIG. 1) in the form of a tip, blade or brush configured to spread metal powder evenly over build platform 118, i.e., build platform 118 or a previously formed layer of AM component(s) 102, to create a layer of raw material. The actuator element may be coupled to member 176 using a holder (not shown) in any number of ways.

The process may use different raw materials 166 in the form of metal powder. Raw materials 166 may be provided to applicator 164 in a number of ways. In one embodiment, shown in FIG. 1, a stock of raw material 166 may be held in a raw material source 178 in the form of a chamber accessible by applicator 164. In other arrangements, raw material may be delivered through applicator 164, e.g., through member 176 in front of its applicator element and over build platform 118. In any event, an overflow chamber 179 may be provided on a far side of applicator 164 to capture any overflow of raw material not layered on build platform 118. In FIG. 1, only one applicator 164 is shown. In some embodiments, applicator 164 may be among a plurality of applicators in which applicator 164 is an active applicator and other replacement applicators (not shown) are stored for use with linear transport system 168. Used applicators (not shown) may also be stored after they are no longer usable.

In one embodiment, AM component(s) 102 may be made of a metal which may include a pure metal or an alloy. In one example, the metal may include practically any non-reactive metal powder, i.e., non-explosive or non-conductive powder, such as but not limited to: a cobalt chromium molybdenum (CoCrMo) alloy, stainless steel, an austenite nickel-chromium based alloy such as a nickel-chromium-molybdenum-niobium alloy (NiCrMoNb) (e.g., Inconel 625 or Inconel 718), a nickel-chromium-iron-molybdenum alloy (NiCrFeMo) (e.g., Hastelloy® X available from Haynes International, Inc.), or a nickel-chromium-cobalt-molybdenum alloy (NiCrCoMo) (e.g., Haynes 282 available from Haynes International, Inc.), etc. In another example, the metal may include practically any metal such as but not limited to: tool steel (e.g., H13), titanium alloy (e.g., $Ti_6Al_4V$), stainless steel (e.g., 316L) cobalt-chrome alloy (e.g., CoCrMo), and aluminum alloy (e.g., $AlSi_{10}Mg$). In another example, the metal may include a gamma prime hardened superalloy such as but not limited to nickel-based superalloys like Inconel 738, MarM 247 or CM247, or cobalt-based superalloys such as but not limited to those known under their brand names: IN738LC, Rene 108, FSX 414, X-40, X-45, MAR-M509, MAR-M302 or Merl 72/Polymet 972.

The atmosphere within processing chamber 142 is controlled for the particular type of melting beam source being used. For example, for lasers, processing chamber 142 may be filled with an inert gas such as argon or nitrogen and controlled to minimize or eliminate oxygen. Here, control system 120 is configured to control a flow of an inert gas mixture 180 within processing chamber 142 from a source of inert gas 182. In this case, control system 120 may control a pump 184, and/or a flow valve system 186 for inert gas to control the content of gas mixture 180. Flow valve system 186 may include one or more computer controllable valves, flow sensors, temperature sensors, pressure sensors, etc., capable of precisely controlling flow of the particular gas. Pump 184 may be provided with or without valve system 186. Where pump 184 is omitted, inert gas may simply enter a conduit or manifold prior to introduction to processing chamber 142. Source of inert gas 182 may take the form of any conventional source for the material contained therein, e.g. a tank, reservoir or other source. Any sensors (not shown) required to measure gas mixture 180 may be provided. Gas mixture 180 may be filtered using a filter 188 in a conventional manner. Alternatively, for electron beams, processing chamber 142 may be controlled to maintain a vacuum. Here, control system 120 may control a pump 184 to maintain the vacuum, and flow valve system 186, source of inert gas 182 and/or filter 188 may be omitted. Any sensors (not shown) necessary to maintain the vacuum may be employed.

A vertical adjustment system 190 may be provided to vertically adjust a position of various parts of AM printer 122 to accommodate the addition of each new layer, e.g., a build platform 118 may lower and/or chamber 142 and/or applicator 164 may rise after each layer. Vertical adjustment system 190 may include any now known or later developed linear actuators to provide such adjustment that are under the control of control system 120.

In operation, build platform 118 with metal powder thereon is provided within processing chamber 142, and control system 120 controls the atmosphere within processing chamber 142. Control system 120 also controls AM printer 122, and in particular, applicator 164 (e.g., linear actuator 174) and melting beam source(s) 110, 112, 114, 116 to sequentially melt layers of metal powder on build platform 118 to generate AM component(s) 102 according to embodiments of the disclosure. As noted, various parts of AM printer 122 may vertically move via vertical adjustment system 190 to accommodate the addition of each new layer, e.g., a build platform 118 may lower and/or chamber 142 and/or applicator 164 may rise after each layer.

Figure 2:
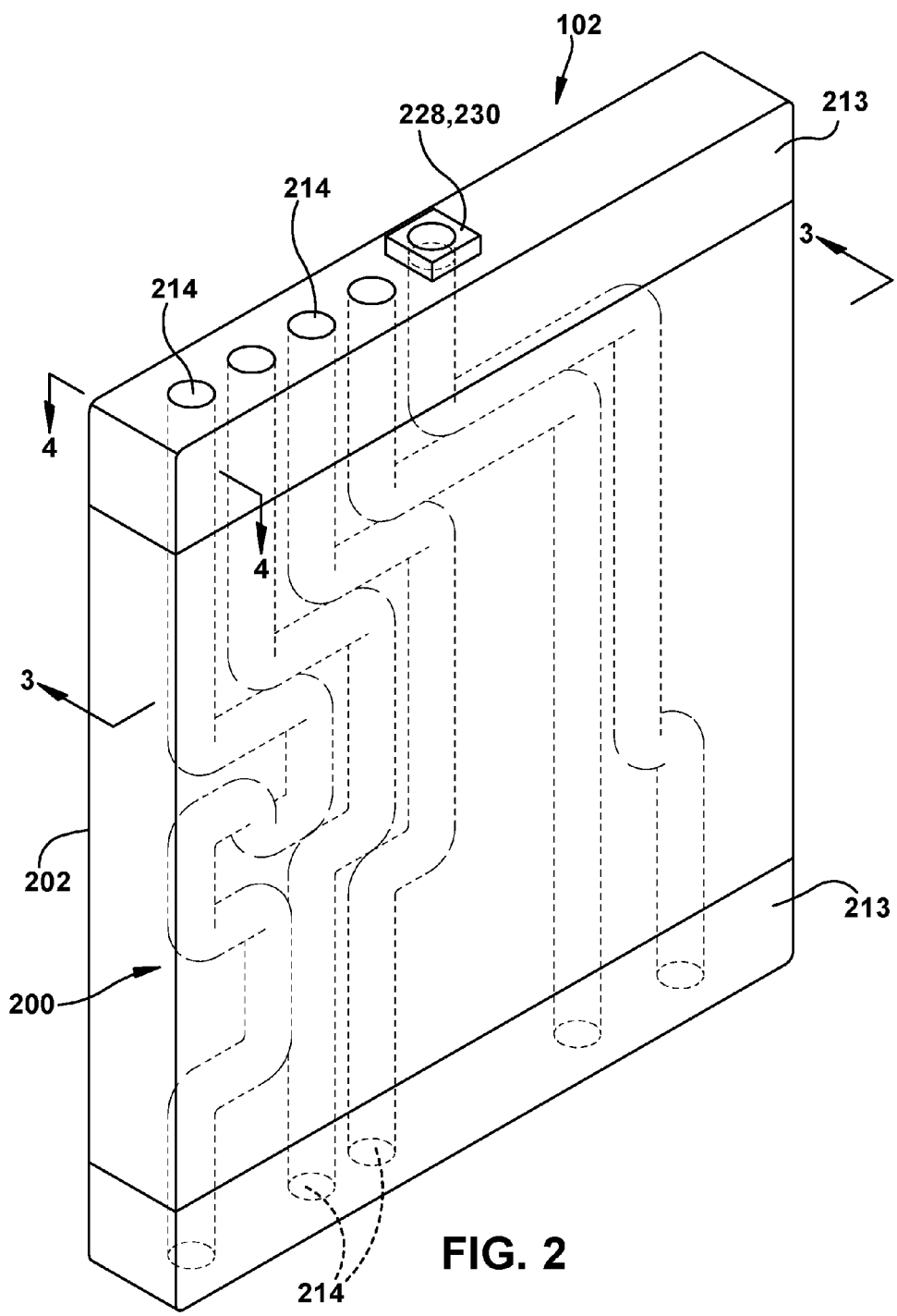
FIG. 2 shows a perspective view of an illustrative component in the form of a hot gas path (HGP) component upon which embodiments of the disclosure may be applied.
Figure 5:
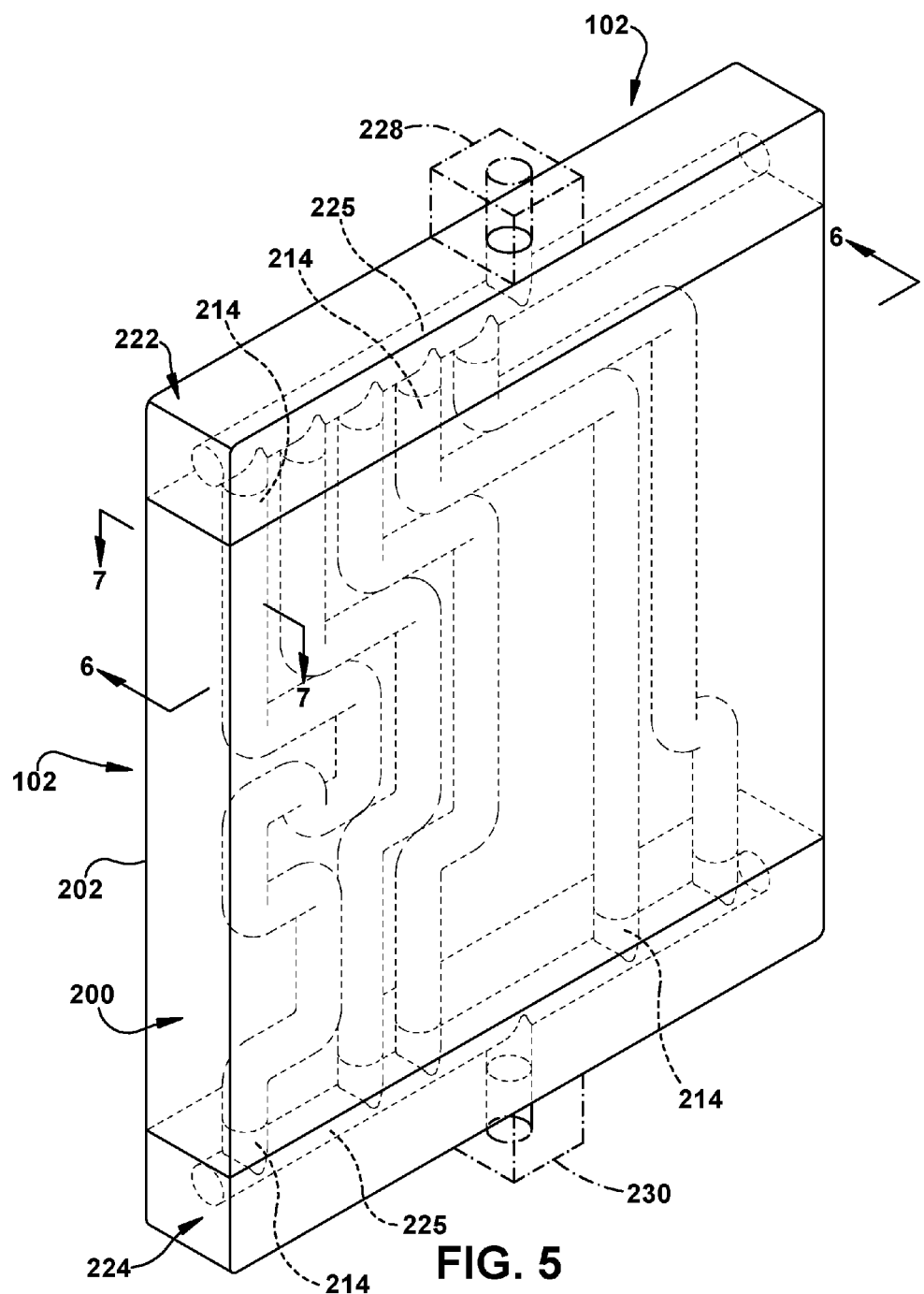
FIG. 5 shows a perspective view of an illustrative component in the form of a hot gas path (HGP) component undergoing processing according to embodiments of the disclosure.
Figures 6, 7:
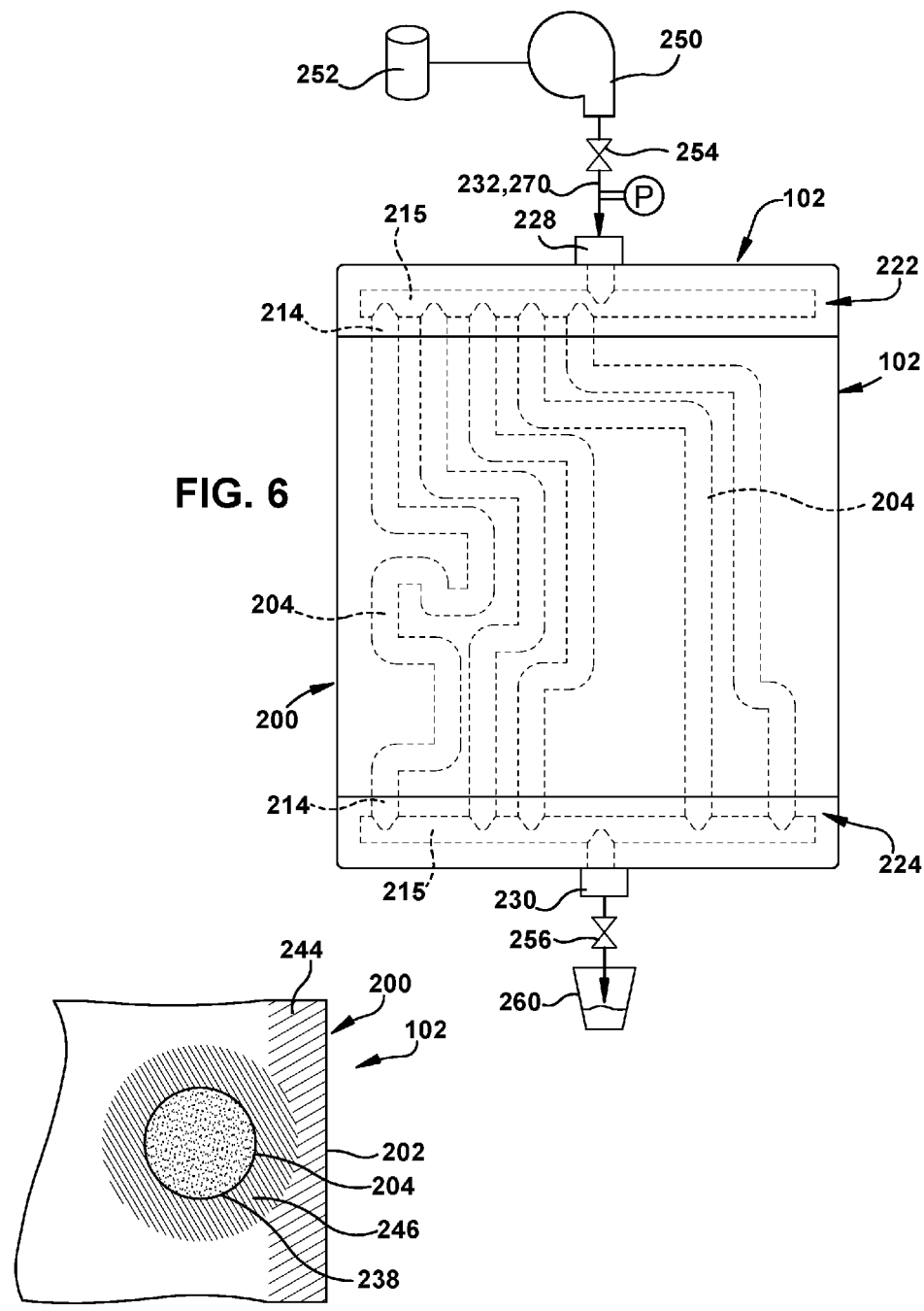
FIG. 6 shows a longitudinal cross-sectional view of the illustrative component of FIG. 5 along line 6-6.
FIG. 7 shows a partial lateral cross-sectional view of the illustrative component of FIG. 5 along line 7-7.

FIGS. 2-3 show one example of an AM component 102 that will be used for further description of the disclosure, and FIGS. 5-6 show another example. FIGS. 2 and 5 show perspective views, FIGS. 3 and 6 show longitudinal cross-sectional views along line 3-3 in FIGS. 2 and 6-6 in FIG. 5, respectively. FIGS. 4 and 7 show partial lateral cross-sectional views along line 4-4 in FIGS. 2 and 7-7 in FIG. 5, respectively.

AM component 102 may be made by any metal powder additive manufacturing process, such as that described relative to FIG. 1. AM component 102 may be made using any of the above-described metal powders. AM component 102 includes a body 200 which may have any shape, but is shown as an elongated cube in the FIGS. 2-3 and 5-6 examples. In one example, AM component 102 may be any form of hot gas path (HGP) component such as a turbomachine blade or nozzle, but such application is not necessary. Body 200 has an external surface 202 and an internal opening(s) 204 (FIGS. 3 and 6 only) passing at least partially through body 200. In the drawings, internal opening(s) 204 is shown as a cooling channel. As used herein, however, "internal opening" indicates any opening within body 200 of an AM component 102 including but not limited to a channel, passage, a cavity and/or a void. Internal opening(s) 204, as shown in FIG. 4, include an unused metal powder 206 from the additive manufacturing process therein. That is, unused metal powder 206 that was not melted or sintered as part of the metal powder additive manufacturing process (FIG. 1) remains in powder form within internal opening(s) 204. Unused metal powder 206 may vary in size depending on the particular material, but in one example may be 10-50 micrometers (microns). Internal opening(s) 204 is at least partially filled and typically completed filled with unused metal powder 206 (FIG. 4). As shown in FIGS. 2-3 and 5-6, any number of internal openings 204 may be present in AM component 102, and the residual surface stress converting process according to embodiments of the disclosure can be applied to any number of internal opening(s) 204 individually or collectively. In one embodiment, internal opening(s) 204 includes a cooling channel and is within, in one example, 0.3 to 3.0 millimeters (mm) of external surface 202 of body 200, and in another example, 0.3 to 0.8 mm of external surface 202 of body 200. However, where internal opening(s) 204 are cooling channels, any distance to ensure cooling during operation of component 102 will suffice. It is emphasized however that such close proximity to external surface 202 is not necessary to benefit from the teachings of the disclosure.

In one embodiment, after additive manufacture, as shown in FIGS. 2-3, AM component 102 includes a pair of manifolds 210, 212 for collective removal of unused metal powder 206 from internal opening(s) 204 and stress conversion according to embodiments of the disclosure. In FIGS. 2-3, each manifold 210, 212 includes a coupling section 213 that may be integrally formed with AM component 102 and includes a number of openings 214 accessible to an exterior of the AM component. As shown schematically in FIG. 3, each opening 214 is capable of sealingly receiving a conduit 216 from an external, metal powder removal manifold section 218, 220 of manifolds 210, 212, respectively. Each manifold section 218, 220 also includes a common connector conduit 221 coupling to each conduit 216. Manifold section 218 couples to openings 214 on one end of internal openings 204, and manifold section 220 couples to openings 214 on an opposing end of internal openings 204 (shown vertically opposed, but depends on where opposing ends of internal openings 204 exist). Coupling sections 213 may be sacrificial and may be removed once metal powder 106 has been removed. As will be described, manifolds 210, 212 may be used for collective removal of unused metal powder 206 from internal opening(s) 204, e.g., using pressurized air in a conventional fashion, and stress conversion according to embodiments of the disclosure. Once unused metal powder 206 has been removed, manifolds 210, 212 may be removed, and in particular, coupling sections 213 may be removed from AM component 102 if they are not to be part of AM component 102. Coupling sections 213 may be removed using any now known or later developed cutting process, e.g., electro-discharge machining (EDM), cutting wheel, etc. Where openings 214 do not require any special structure for coupling with conduits 216, coupling sections 213 may be omitted and openings 214 remain as part of AM component 102.

In another embodiment, as shown in FIGS. 5 and 6, AM component 102 may include integral, sacrificial manifolds 222, 224 for collective removal of unused metal powder 206 from internal opening(s) 204 (FIG. 6 only) and stress conversion according to embodiments of the disclosure. As understood in the field, manifolds 222, 224 may include openings 214 that mate with internal openings 204, and a common connector conduit 215 (internal manifold) in each manifold coupling to each opening 214 therein. As will be described, manifolds 222, 224 may be used for collective removal of unused metal powder 206 from internal opening(s) 204, e.g., using pressurized air in a conventional fashion, and converting stress according to embodiments of the disclosure. Once unused metal powder 206 has been removed, manifolds 222, 224 may be removed, if they are not to be part of AM component 102. Manifolds 222, 224 may be removed using any now known or later developed cutting process, e.g., electro-discharge machining (EDM), cutting wheel, etc. As will be understood, manifolds 210, 212, 222, 224 may fluidly communicate with any desired internal opening(s) 204, e.g., those requiring residual stress relief.

In accordance with embodiments of the disclosure, one or more ports 228, 230 may be built into manifolds 210, 212 (FIGS. 2-3), 222, 224 (FIGS. 5-6), and/or otherwise provided for fluid communication with one or more openings 204. In FIGS. 2-3, each opening 214 may include its own port 228, 230 (only one shown in FIG. 2), while in FIGS. 5-6, each manifold 222, 224 may have a singular port 228, 230 feeding to common connector conduit 215 thereof. Ports 228, 230 may be male or female depending on what form of conduit is to be coupled thereto (as will be explained relative to FIGS. 5 and 6), e.g., from a compressor 250 or from a metal powder recycling system 260. Ports 228, 230 (and openings 214 where ports are not otherwise provided) may include any now known or later developed mechanism for sealingly delivering pressurized, non-compressible fluid 232 into internal opening(s) 204, e.g., threaded fasteners, snap-in-place sealing connectors, simple openings compatible with conduits having ends that sealingly couple thereto, etc. Ports 228, 230 can be provided as part of manifolds 222, 224 or manifold section(s) 213, or otherwise provided after manifolds 222, 224 or manifold sections 213 are formed, e.g., by threading into threaded ends (not shown).

FIG. 4 shows residual surface stresses 240, 242 present in AM component 102. Residual surface stress 240 may be present in external surface 202 of AM component 102, and residual surface stress 242 may be present in at least a portion of body 200 about internal opening(s) 204. As used herein, "residual surface stress" may include surface stress and near surface stress. As described herein, in one example, each residual surface stress 240, 242 may be tensile. Conventionally, residual surface stress 240 would be addressed by shot peening external surface 202 to impart a compressive stress therein, i.e., convert the tensile residual surface stress into a compressive surface stress. However, there is currently no process to address residual surface stress 242.

Turning to FIGS. 3, 6 and 7, in accordance with embodiments of the disclosure, residual surface stress 242 (FIG. 4) in at least a portion of body 200 about internal opening 204 is converted by applying a pressure P in internal opening(s) 204 using a non-compressible fluid 232 and at least a portion of unused metal powder 206 (FIG. 7). As used herein, "converted" indicates a change in residual surface stress that reduces the impact thereof such as but not limited to at least lowering an amount of surface stress and, more likely, a transformation from one form of stress to another, e.g., tensile to compressive. In one embodiment, a compressor 250 may be fluidly coupled to one of manifolds 210, 222, e.g., a port 228 thereof, and a source 252 of non-compressible fluid 232. Source 252 may include, for example, a tank, reservoir or other holding container appropriate for the non-compressible fluid 232. Compressor 250 can take any form capable of pressurizing non-compressible fluid 232 as described herein, and may include, for example, a pump, a hydraulic or pneumatic ram, etc., depending on the form of non-compressible fluid 232 employed. Compressor 250 may be fluidly coupled to one of manifolds 210 (FIG. 3), 222 (FIG. 6) through a valve 254, e.g., using any necessary conduits. Similarly, an opposing manifold 212 (FIG. 3), 224 (FIG. 6) may include a valve 256 for controlling opening/closing of an opposing end of internal opening(s) 204, thus controlling whether pressure P exerts itself within the opening(s) or causes a flow therethrough, e.g., for purging of unused metal powder 206 to a metal powder recycling system 260, as will be described herein. The term "a least a portion of unused metal powder" indicates that, in some instances, some of unused metal powder 206 may not be effected to convert the stress, e.g., some it may be removed, some of it may be positioned so as not to receive effective amounts of pressure, etc.

Non-compressible fluid 232 may include one or more forms of fluid having a constant material density within an infinitesimal volume that moves with the flow velocity. Non-compressible fluid 232 may also be non-corrosive to the materials of AM component 102. Non-compressible fluid 232 may include but is not limited to: water, an inert gas and/or air. Compressor 250 may include any form of computerized controller (not shown) for accurate control thereof to generate pressurized non-compressible fluid 232 according to embodiments of the disclosure. Compressor 250 may be operatively coupled to control system 120 of AM system 100 or have its own controller (not shown) in communication with control system 120.

The applying of pressure P to convert residual surface stress in internal opening(s) 204 can take a variety of forms. In one embodiment, compressor 250 may oscillate (e.g., pulse) pressure P of non-compressible fluid 232 with at least a portion of unused metal powder 206 in internal opening(s) 204. In this case, the pressure P may oscillate, for example, between 0.1 megaPascal (MPa) to 6.0 MPa, and in one embodiment, between 0.1 to 1.0 MPa. That is, valve 254 is open, valve 256 is closed and compressor 250 changes pressure P between different values. This process may be used to ensure a more equal (e.g., uniform) distribution of pressure P throughout internal opening(s) 204, e.g., by ensuring non-compressible fluid 232 mixes with at least a portion of unused metal powder 206 such that pressure P can be exerted on body 200 about internal opening(s) 204. The range of pressures employed may vary depending on the material of AM component 102. In any event, compressor 250 may consistently apply a pressure P of non-compressible fluid 232 with at least a portion of unused metal powder 206 in internal opening(s) 204 between, for example, 1% and 90% of a tensile strength of a material of AM component 102. That is, valve 254 is open, valve 256 is closed and compressor 250 applies a consistent pressure P between 1% and 90% of a tensile strength of a material of AM component 102. The tensile strength will vary depending on the material of AM component 102. In embodiments, the constant pressure P may be between 60% and 90% of the tensile strength of the material. Compressor 250 may first oscillate pressure P of non-compressible fluid 232 with at least a portion of unused metal powder 206 in internal opening(s) 204, e.g., between 0.1 megaPascal (MPa) to 6.0 MPa, or in one embodiment, between 0.1 MPa to 1.0 MPa, and then consistently apply a pressure P of non-compressible fluid 232 with at least a portion of unused metal powder 206 in internal opening(s) 204 between 1% and 90% of a tensile strength of a material of AM component 102. In this fashion, an even distribution of pressure P can be created using the pressure oscillation, followed by a consistent application of pressure P. In any event, as shown in FIG. 7, pressure P is sufficient at one point or another to create a stress in at least portion of an internal surface 238 of body 200 about internal opening(s) 204 to convert residual surface stress 242 (FIG. 4), e.g., by lessening a tensile surface stress or creating a compressive stress 246 (FIG. 7) therein. Again, pressure P may vary depending on the material of AM component 102 and the amount of pressure required to reduce tensile stress or create compressive stress 246 (FIG. 7) therein. In any event, pressure P is such as to convert residual surface stress 242 (FIG. 4), e.g., tensile stress, in at least a portion of body 200 about internal opening 204 to at least a lower amount of (e.g., tensile) stress or transform it to another form of stress, e.g., compressive. In this fashion, any cracking or other damage that could occur in, about or extending from internal opening(s) 204 during later processing, e.g., heat treatment, may be mitigated. As shown in FIG. 7, AM component 102 now includes a lower tensile or compressive stress 246 in at least a portion of an internal surface 238 of body 200 about internal opening(s) 204.

It is emphasized that while particular structure such as manifolds 210, 212 (FIG. 3), 222, 224 (FIG. 6) have been described for delivering pressure P to internal opening(s) 204, a variety of alternative structures may be employed within the scope of the disclosure. The disclosure is not limited to any particular mechanism to deliver pressure P as described herein.

Continuing with FIGS. 3 and 6, a next process may include purging internal opening(s) 204 of unused metal powder 206, i.e., during or after converting pressure P used for converting stress in internal opening(s) 204. In this case, valve 256 may be opened when pressure P used for converting stress in internal opening(s) 204 is still present in the internal opening(s). As a result, non-compressible fluid 232 can exit from manifold 212 (FIG. 3) or manifold 224 (FIG. 6) to metal powder recycling system 260, carrying with it unused metal powder 206. In this fashion, internal opening(s) 204 are at least initially purged of unused metal powder 206 with non-compressible fluid 232, after the converting of residual surface stress 242 (FIG. 4). Subsequently, internal opening(s) 204 may optionally be further purged of unused metal powder 206 with, for example, a pressurized air flow 270 (created, e.g., from compressor 250), after initial purging by non-compressible fluid 232. This latter purging is as would be typically performed after additive manufacture.

Figure 8:
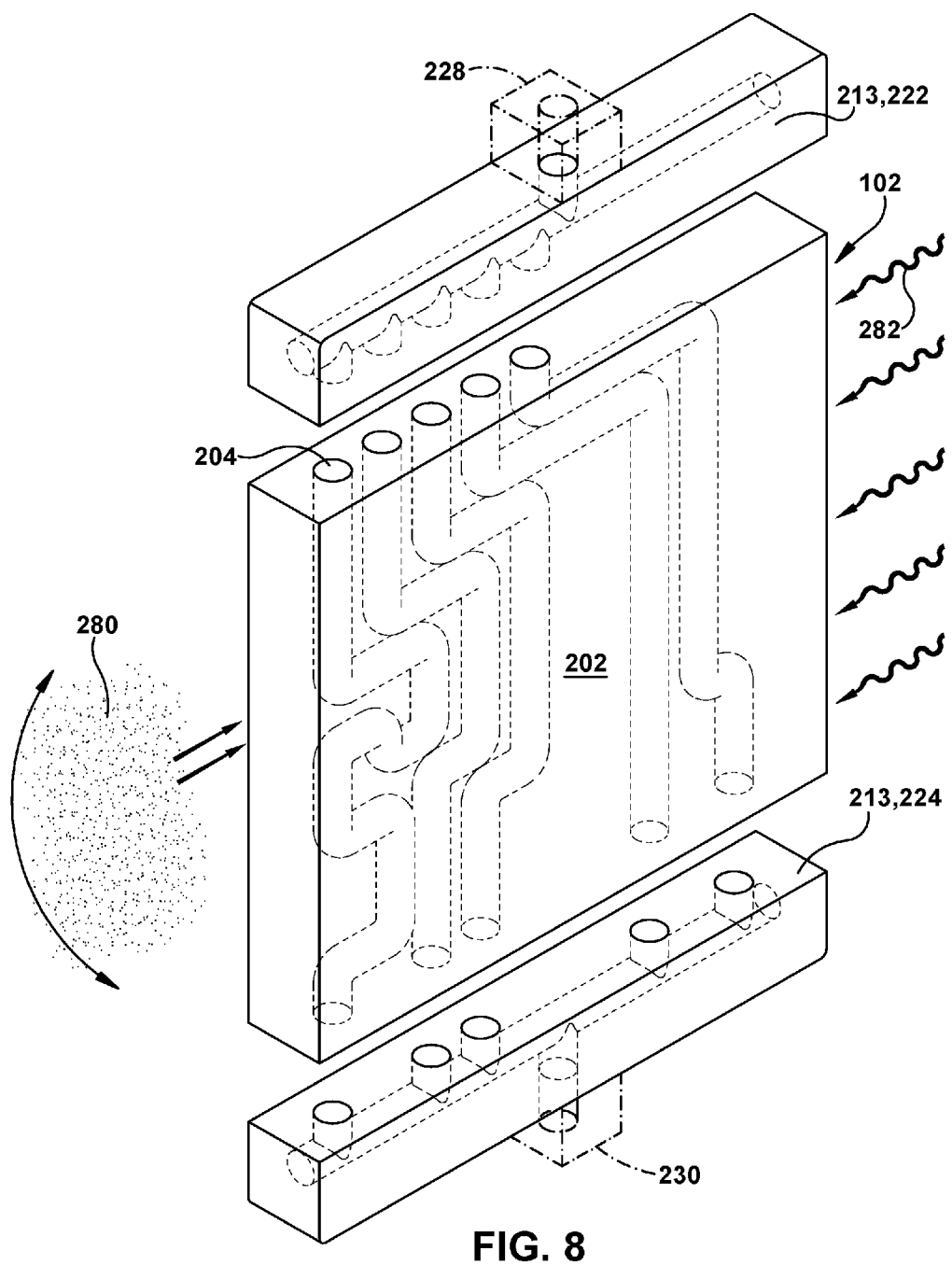
FIG. 8 shows a schematic perspective view of the illustrative component of FIGS. 5-7 undergoing additional processing according to embodiments of the disclosure.

FIG. 8 shows a perspective view of AM component 102 collectively illustrating additional processes that may be performed on AM component 102 according to embodiments of the disclosure. In a first additional process, residual surface stress 240 (FIG. 4) in external surface 202 (FIG. 3) may be converted by cold working the external surface, e.g., by imparting a compressive stress 244 (FIG. 7). In one embodiment, the cold working may include shot peening 280, however other now known or later developed forms of imparting compressive stress 244 (FIG. 7) to external surface 202 may also be employed such as but not limited to ultrasound, rolling or pressurizing. In one embodiment, converting residual surface stress 242 in internal opening(s) 204 (per FIGS. 3 and 6), and converting residual surface stress 240 (FIG. 4) (per FIG. 8) in external surface 202 may occur simultaneously. That is, pressure P may be applied to internal opening(s) 204 while external surface 202 of AM component 102 is cold worked, which would save time in the processing.

Continuing with FIG. 8, another process may include heat treating 282 of AM component 102. Heat treating 282 can be carried out after converting residual surface stress 242 (FIG. 4) in internal opening(s) 204 and/or residual surface stress 240 (FIG. 4) in external surface 202. The heat treating may include any now known or later developed heat treating appropriate for the material(s) of AM component 102. Another process shown in FIG. 8 may include removing manifolds 222, 234 or manifold sections 213 (shown only as manifolds 222, 224 of FIG. 6), where necessary, e.g., by EDM.

AM component 102 includes body 200 having external surface 202 and internal opening(s) 204 passing at least partially through body 200. External surface 202 includes a tensile stress (less tensile than initially) (indicated as compressive stress 244 (FIG. 7)) therein, and at least a portion of internal surface 238 of internal opening(s) 204 includes compressive stress 246 therein. The depths of each stress 246, 244 may depend on the material(s) of AM component 102, the initial stresses therein and the pressures used to create the compressive stress.

By introducing a non-compressible fluid into closed circuit, internal opening(s) 204 formed by and applying a pressure level at a sufficient range with external equipment (e.g., compressor 250), embodiments of the disclosure effect a conversion of residual surface stress into a lower or compressive stress that is less likely to cause harm during later processing. Further, the superposition of internal and outer stress relief/conversion shifts the stress gradients towards the inside of AM component 102, which also lowers the chances of harm during later processing. Consequently, AM components 102 formed according to embodiments of the disclosure overcome the limited effectiveness of conventional shot peening for internal opening(s) 104, e.g., cooling channels and similar features, to prevent the occurrence of SAC for high gamma prima alloyed components during, e.g., a stress relief heat treatment after the DMLM process. Embodiments of the disclosure thus have the potential to yield crack-free high gamma prima alloyed AM components and also improve overall yield. Furthermore, the treatment will most likely result in higher mechanical properties especially for cyclic application.

It should be noted that in some alternative implementations, the acts described may occur out of the order noted or, for example, may in fact be executed substantially concurrently or in the reverse order, depending upon the act involved. Also, one of ordinary skill in the art will recognize that additional processes may be added.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. "Approximately" as applied to a particular value of a range applies to both values, and unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method, comprising:
   receiving a component made by a metal powder additive manufacturing process, the component including a body having an external surface and an internal opening passing at least partially through the body, the internal opening including an unused metal powder from the additive manufacturing process therein; and
   converting a residual surface stress in at least a portion of the body about the internal opening by applying a pressure in the internal opening using a non-compressible fluid and at least a portion of the unused metal powder.

2. The method of claim 1, wherein the converting residual surface stress includes:
   first oscillating the pressure of the non-compressible fluid with the at least a portion of the unused metal powder in the internal opening between 0.1 megaPascal (MPa) to 6.0 MPA; and
   second consistently applying the pressure of the non-compressible fluid with the at least a portion of the unused metal powder in the internal opening between 1% and 90% of a tensile strength of a material of the component.

3. The method of claim 1, wherein the converting residual surface stress includes oscillating the pressure of the non-compressible fluid with the at least a portion of the unused metal powder in the internal opening between 0.1 megaPascal (MPa) to 6.0 MPA.

4. The method of claim 1, wherein the converting residual surface stress includes consistently applying the pressure of the non-compressible fluid with the at least a portion of the unused metal powder in the internal opening between 10% and 90% of a tensile strength of a material of the component.

5. The method of claim 1, further comprising first purging the internal opening of the unused metal powder with the non-compressible fluid, after the converting the residual surface stress.

6. The method of claim 5, further comprising second purging the internal opening of the unused metal powder with a pressurized air flow, after the first purging.

7. The method of claim 1, further comprising converting a residual surface stress in the external surface by cold working the external surface.

8. The method of claim 7, wherein the converting residual surface stresses in the internal opening and the external surface occur simultaneously.

9. The method of claim 7, further comprising heat treating the component after the converting the residual surface stress in the internal opening and the external surface.

10. The method of claim 1, wherein the internal opening is within 0.3 to 3.0 millimeters of the external surface of the body.

11. The method of claim 1, wherein the component includes one of a nickel-based gamma prime hardened superalloy and a cobalt-based gamma prime hardened superalloy.

12. A method, comprising:
    receiving a component made by a metal powder additive manufacturing process, the component including a body having an external surface and an internal opening passing at least partially through the body, the internal opening including an unused metal powder from the additive manufacturing process therein; and
    converting a residual surface stress in at least a portion of the body about the internal opening by applying a pressure in the internal opening using a non-compressible fluid and at least a portion of the unused metal powder by:
    first oscillating the pressure of the non-compressible fluid with the at least a portion of the unused metal powder in the internal opening, and
    second consistently applying the pressure of the non-compressible fluid with the at least a portion of the unused metal powder in the internal opening at a value that is a percentage of a tensile strength of a material of the component;
    purging the internal opening of the unused metal powder;
    converting a residual surface stress in the external surface by cold working the external surface; and
    heat treating the component.

13. The method of claim 12, wherein first oscillating the pressure of the non-compressible fluid with the at least a portion of the unused metal powder in the internal opening is between 0.1 megaPascal (MPa) to 6.0 MPA.

14. The method of claim 12, wherein the value that is the percentage of the tensile strength of the material of the component is between 10% and 90% of the tensile strength of the material of the component.

15. The method of claim 12, wherein the converting residual surface stresses in the internal opening and the external surface occur simultaneously prior to the purging.

16. The method of claim 12, wherein the internal opening is within 0.3 to 3.0 millimeters of the external surface of the body.

17. The method of claim 12, wherein the purging includes:
    first purging the internal opening of the unused metal powder with the non-compressible fluid; and
    second purging the internal opening of the unused metal powder with a pressurized air flow.

* * * * *